(12) United States Patent
Jakubowicz

(10) Patent No.: US 11,501,110 B2
(45) Date of Patent: Nov. 15, 2022

(54) DESCRIPTOR LEARNING METHOD FOR THE DETECTION AND LOCATION OF OBJECTS IN A VIDEO

(71) Applicants: INSTITUT MINES TELECOM, Paris (FR); CENTRE NATIONAL DE LA RECHERCHE SCIENTIFIQUE, Paris (FR)

(72) Inventor: Jérémie Jakubowicz, Malakoff (FR)

(73) Assignees: INSTITUT MINES TELECOM, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 271 days.

(21) Appl. No.: 16/621,643

(22) PCT Filed: Jun. 8, 2018

(86) PCT No.: PCT/EP2018/065241
§ 371 (c)(1),
(2) Date: Dec. 11, 2019

(87) PCT Pub. No.: WO2018/228955
PCT Pub. Date: Dec. 20, 2018

(65) Prior Publication Data
US 2020/0210774 A1 Jul. 2, 2020

(30) Foreign Application Priority Data
Jun. 12, 2017 (FR) ........................................ 1755232

(51) Int. Cl.
*G06K 9/62* (2022.01)
*G06N 3/04* (2006.01)
(Continued)

(52) U.S. Cl.
CPC ............ *G06K 9/6257* (2013.01); *G06K 9/628* (2013.01); *G06K 9/6265* (2013.01);
(Continued)

(58) Field of Classification Search
CPC ............. G06K 9/6257; G06K 9/00711; G06K 9/6265; G06K 9/628; G06N 3/0454; G06N 3/08; G06V 20/40
See application file for complete search history.

(56) References Cited

U.S. PATENT DOCUMENTS 7,246,314 B2 7/2007 Foote et al.
8,254,699 B1 8/2012 Zhao et al.
(Continued)

FOREIGN PATENT DOCUMENTS

CN 106557778 A 4/2017
WO 2016081880 A1 5/2016

OTHER PUBLICATIONS

D. Ciresan et al "Multi-column Deep Neural Networks for Image Classification", Computer Vision and Pattern Recognition, 2012, pp. 8.
(Continued)

*Primary Examiner* — Qun Shen
(74) *Attorney, Agent, or Firm* — Nelson Mullins Riley & Scarborough LLP; Anthony A. Laurentano

(57) ABSTRACT

The present invention relates to a method for learning class descriptors for the detection and the automatic location of objects in a video, each object belonging to a class of objects from among a set of classes, the method using:
a learning base, composed from reference videos and containing annotated frames each comprising one or more labels identifying each object detected in the frames,
descriptors associated with these labels and learned previously by a preprocessing neural network from the annotated frames of the learning base,
(Continued)

Figure 1:
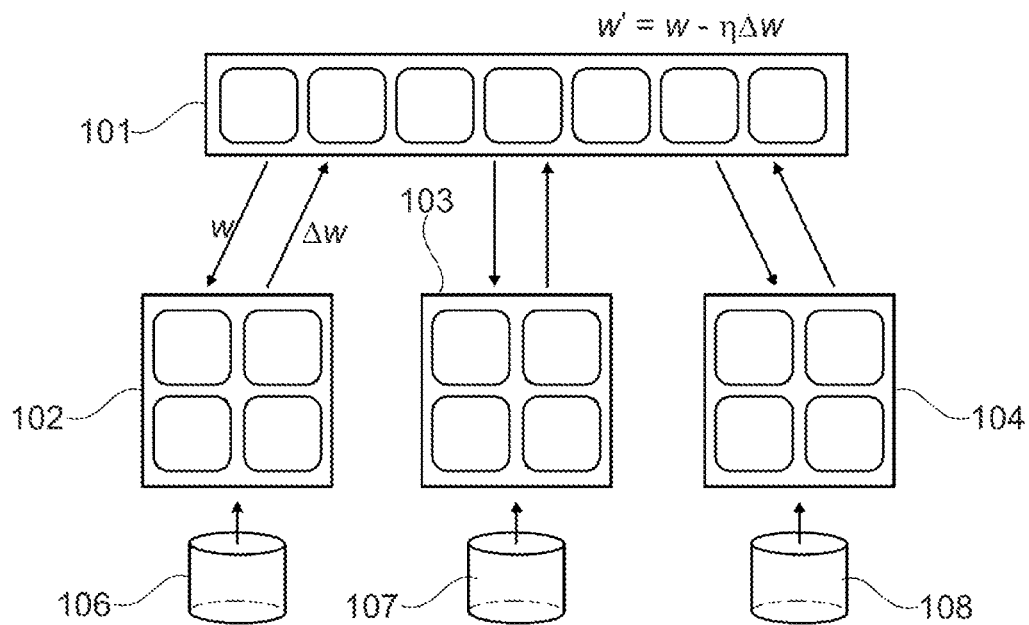

an architecture of neural networks defined by parameters centralized on a plurality of parameter servers, and a plurality of computation entities working in parallel, a method in which, for each class of objects, one of the neural networks of the architecture is trained by using as input data the descriptors and the labels to define class descriptors, each computation entity using, for the computation of the class descriptors, a version of the parameters of the parameter server on which the entity depends, and returning to this parameter server the parameters updated at the end of its computation, and the parameter servers exchanging with one another the parameters of each computation entity for the training of the neural networks for each class descriptor.

14 Claims, 4 Drawing Sheets

(51) Int. Cl.
*G06N 3/08* (2006.01)
*G06V 20/40* (2022.01)

(52) U.S. Cl.
CPC .............. *G06N 3/0454* (2013.01); *G06N 3/08* (2013.01); *G06V 20/40* (2022.01)

(56) References Cited

U.S. PATENT DOCUMENTS

| 8,792,732 | B1 | 7/2014 | Zhao et al. | |
|---|---|---|---|---|
| 2009/0141969 | A1* | 6/2009 | Yu | G06K 9/6256 382/157 |
| 2012/0238254 | A1 | 9/2012 | Yankovich et al. | |
| 2013/0278760 | A1* | 10/2013 | Beams | H04N 7/18 348/143 |
| 2014/0293091 | A1* | 10/2014 | Rhoads | G01J 3/51 348/234 |
| 2016/0292510 | A1* | 10/2016 | Han | G11B 27/06 |
| 2017/0109582 | A1* | 4/2017 | Kuznetsova | G06K 9/3241 |
| 2017/0236290 | A1* | 8/2017 | Sorkine Hornung | G06V 20/49 382/173 |
| 2018/0330198 | A1* | 11/2018 | Harary | G06K 9/00691 |
| 2020/0050968 | A1* | 2/2020 | Lee | G06N 20/00 |

OTHER PUBLICATIONS

Held David et al, "Learning to Track at 100 FPS with Deep Regression Networks", Computer Vision—ECCV 2016, vol. 9905, No. 558, doi:10.1007/978-3-319-46448-0_45, ISBN 978-3-319-46447-3, (Sep. 17, 2016), pp. 26.

International Search Report dated Nov. 29, 2018 from PCT/EP2018/065241, pp. 3.

J. Deng et al, "ImageNet: A Large-Scale Hierarchical Image Database", Computer Vision and Pattern Recognition, 2009, pp. 8.

J. Redmon et al, "You only look once: Unified, real-time object detection", Computer Vision and Pattern Recognition, 2016, pp. 14.

Jeffrey Dean et al, "Large scale distributed deep networks", The 26th annual conference on Neural Information Processing Systems (NIPS'25): Dec. 3-8, 2012, (Dec. 6, 2012). pp. 11.

K. He et al, "Deep Residual Learning for Image Recognition", Computer Vision and Pattern Recognition, 2016, pp. 12.

Mu Li et al, "Scaling Distributed Machine Learning with the Parameter Server", Proceedings of the 2014 International Conference on Big Data Science and Computing, Bigdatascience '14, New York, New York, USA, (Jan. 1, 2014), pp. 16.

Q. V. Le et al, "Building high-level features using large scale unsupervised learning", International Conference on Machine Learning, 2012, pp. 8.

S. Ren et al, "Faster R-CNN: towards real-time object detection with region proposal networks", Advances in Neural Information Processing Systems, 2015, pp. 8.

W. Liu et al ("SSD: Single shot multibox detector", European Conference on Computer Vision, 2016), pp. 17.

Wang Jianzong et al, DistDL: A Distributed Deep Learning Service Schema with GPU Accelerating, ECCV 2016 Conference; [Lecture Notes in Computer Science; Lect.Notes Computer], Springer International Publishing, Cham, (Nov. 13, 2015). pp. 793-804.

Y. Taigman et al., "DeepFace: Closing the Gap to Human-Level Performance in Face Verification", Computer Vision and Pattern Recognition, 2014, pp. 8.

* cited by examiner

STATE of the ART

DESCRIPTOR LEARNING METHOD FOR THE DETECTION AND LOCATION OF OBJECTS IN A VIDEO

CROSS-REFERENCE TO RELATED APPLICATIONS

This Application is a U.S. National Phase Application of International Application No. PCT/EP2018/065241, filed on Jun. 8, 2018, which claims priority to, and the benefit of French Application No. 1755232, filed on Jun. 12, 2017, the entire teachings of which are incorporated herein by reference.

The present invention relates to a method for detecting and locating objects in digital videos.

The detection and the automatic location of objects in digital videos is a particularly active and complex area, for which no existing current solution manages to compete with human performance when the catalog of objects to be detected and located is vast.

The term "object" should be understood in a broad sense and designates any coherent entity that is spatially and temporally delimited in the videos. People, faces, vehicles, animals, buildings are thus considered, among others, as objects.

The problem of detecting and locating objects has been investigated in the context of images, leading to methods having performance levels close to human performance for the detection of objects. In particular, the detection of handwritten numerals by automatic learning methods shows performance levels equal to or greater than human performance, as described in the article by D. Ciresan et al "*Multi-column Deep Neural Networks for Image Classification*", Computer Vision and Pattern Recognition, 2012. The detection of faces has also reached a level of maturity sufficient to be used in different image acquisition devices, as shown in the article by Y. Taigman et al, "*DeepFace: Closing the Gap to Human-Level Performance in Face Verification*", Computer Vision and Pattern Recognition, 2014.

The problem of detecting and locating objects in digital images is both linked to and distinct from the analogous problem in the videos. Indeed, in the images, the problem is made more difficult by the fact that it lacks the temporal dimension that makes it possible to facilitate the detection inasmuch as the coherent movement of an entity assists in identifying it as such. By contrast, it is made simpler by the smaller quantity of data to be processed.

The choice of the descriptors constitutes a major issue, because the latter strongly condition the final result of the search or of the classification. The form descriptors characterize the outlines of the objects and make it possible to separate them into classes. One method for recognizing objects in the videos as in images consists in using supervised automatic learning (or "supervised machine learning"). This technique requires an annotated database, called learning base, in which the objects that are sought to be located are marked and their class indicated. The construction of annotated databases relies on tedious human work. Collaborative efforts have made it possible to put in place such databases, of large size, for images, described notably in the article by J. Deng et al, "*ImageNet: A Large-Scale Hierarchical Image Database*", Computer Vision and Pattern Recognition, 2009. However, databases of comparable span making it possible to detect a large class of objects do not currently exist for videos.

It is known practice, from the international application WO 2016/081880, to search, in a large volume of video data, videos containing certain objects, from a client request providing a relationship to be sought between these objects, for example a traffic accident between a vehicle and a cyclist on surveillance videos.

The patents U.S. Pat. Nos. 8,792,732 and 8,254,699 describe annotation methods using the metadata of video contents, notably of YouTube videos, to automatically annotate the video databases in order to create a descriptor base.

Most of the known current techniques for object recognition, whether it be for images or for videos, use so-called "deep" neural networks, currently containing increasing numbers of parameters, like the architecture described in the article by Q. V. Le et al, "*Building high-level features using large scale unsupervised learning*", International Conference on Machine Learning, 2012. For example, the ResNet architecture, described in article by K. He et al, "*Deep Residual Learning for Image Recognition*", Computer Vision and Pattern Recognition, 2016, uses 152 hidden layers to recognize 1000 classes of objects.

This deep neural network shows good performance, but not comparable to human performance, for the problem of classification of objects in digital images, as well as the neural networks derived from the "Faster R-CNN" architecture, described in the article by S. Ren et al, "*Faster R-CNN: towards real-time object detection with region proposal networks*", Advances in Neural Information Processing Systems, 2015, such as the YOLO network of the article by J. Redmon et al, "*You only look once: Unified, real-time object detection*", Computer Vision and Pattern Recognition, 2016, or the SSD network of W. Liu et al ("*SSD: Single shot multibox detector*", European Conference on Computer Vision, 2016).

Inasmuch as these architectures are constructed on the analysis of just one image, they can be used for a video which is a succession of images, called "frames" hereinbelow, each frame being analyzed independently of the others.

The application US 2012/0238254 describes a method allowing a user to select an area of an image of a video which is currently being viewed on a mobile device, in order to identify an object located in this area by using an object library, in order in particular to generate advertising offerings concerning the identified object and originating from at least one merchant site.

From the patent U.S. Pat. No. 7,246,314, it is known practice to interactively select a scene in a video in order to retrieve similar scenes in the rest of the video or in other videos. This method, using the segmentation and gaussian models, does not allow the accurate detection of objects.

In most of the videos of interest for consumers, there is a significant redundancy between two successive frames of one and the same video. Since this redundancy is not explicitly taken into account in these solutions, oscillation phenomena can occur: in one frame, for example, an object is correctly detected, in the next, because of the noise, it is no longer, then it is once again detected a few frames later. It is perfectly possible to a posteriori regularize the detection, that is to say favor the detections that can be matched with preceding detections.

To train the models associated with such architectures, it is necessary to distribute computations, because the required computer power is very high, and a very large number of computation entities that can be used, for example up to a hundred graphics processors ("GPU"). The article by Dean et al, "*Large Scale Distributed Deep Networks*", Advances in Neural Information Processing Systems, 2012 describes a system, represented in FIG. 1, using a parameter server 101 which supplies different computation entities 102, 103, 104, each working in parallel from a fragment of data 106, 107, 108 (called "shards"), and updating the parameters w asynchronously, the computation units not waiting for one another. More specifically, each computation entity reads the current parameters w to a request addressed to the parameter server, performs its computation and returns the updated parameters Δw through another request addressed to the parameter server. The final parameters w' are a function of the current parameters w, of the parameters Δw updated on each entity, and of η the learning rate of the model, in this example: w'=w−ηΔw. There is thus distribution of the computations and distribution of the data.

This system, while it does indeed manage to overcome the computation dependencies through the use of asynchronous read/write operations from and to the parameter server, does create a hold-up point through the requests addressed to a single parameter server which becomes the bottleneck of the system. The more computation entities there are working in parallel, the more significant this difficulty in distribution of the computations will be.

There is a need to obtain an effective method for detecting and locating objects in videos, which allows sealing to easily detect and locate many classes of objects over numerous videos.

Thus, the subject of the invention, according to a first of its aspects, is a method for learning class descriptors for the detection and the automatic location of objects in a video, each object belonging to a class of objects j from among a set of J classes, the method using:

a learning base, composed from reference videos and containing annotated frames $(x_t, y_t)_{1 \leq t \leq T}$ each comprising labels identifying each object detected in the frames, descriptors associated with these labels and learned previously by a preprocessing neural network from the annotated frames of the learning base, an architecture of neural networks defined by parameters centralized on a plurality of parameter servers, and a plurality M of computation entities m working in parallel, a method in which for each class of objects j, one of the neural networks of the architecture is trained by using as input data the descriptors and the labels $(\phi_{k,t}, z_{k,t}^j)$ to define class descriptors $\hat{z}_{\theta_j}$, each computation entity m using, for the computation of class descriptors $\hat{z}_{\theta_j}$, a version of the parameters $\theta_{j,m}$ of the parameter server on which the entity depends, and returning to this parameter server the parameters updated at the end of its computation, and the parameter servers exchanging with one another the parameters of each computation entity for the training of the neural networks for each class descriptor $\hat{z}_{\theta_j}$.

The invention makes it possible, by using the techniques of detection and location of objects in fixed images, to have a labeled base that is sufficiently large and representative and contains effective descriptors.

The method according to the invention also constitutes an algorithm that is distributed and asynchronous over several computation and storage entities working in parallel, suited to the learning of the detection and location models, for a great quantity of data. The parameters of the neural networks are thus distributed, and the learning is asynchronous, one computation unit not waiting for the result of the computation of the other entities to update its parameters. The fact that each computation entity has its own estimation of parameters makes it possible not to rely on a single parameter server.

The method according to the invention allows an effective scaling, by proposing the learning of a model based on numerous videos with numerous classes of objects to be detected and located. The neural networks trained for the implementation of the invention can thus be transferred from one video to another.

The invention can be applied to the surveillance of wide scale video contents, as available in the social networks, and to online advertising in videos, in particular for online sales, called "e-commerce". The objects to be detected in the videos can correspond to or resemble objects of a sales catalog. The content of the video can be applicable, notably to be able to click on certain detected objects in order to return to the e-commerce site corresponding to the object or objects selected.

The neural networks used in the invention are preferably convolution neural networks ("CNN"). In this type of network, the convolutions take place both in time and in space, the convolution layer being followed by fully connected layers for performing the classification.

Learning Base

The learning base is preferably composed from the detection and the location of the objects frame by frame, in each reference video.

A reference video X is composed of a set T of frames $x_t$ in which t is the frame index, varying between 1 and T: $X=(x_t)_{1 \leq t \leq T}$. A plurality N of reference videos $X_n$ (with $1 \leq n \leq N$) can be used to construct the learning base.

Each frame $x_t$ comprises objects $y_t$. The vector $y_t$ advantageously comprises a series of components $y_{i,t}$ representing a scalar number lying between 0 and 1 and coding the presence of the object obj(i) at the location loc(i), with in particular 1 designating its presence and 0 its absence. The types of objects and their locations can be represented by a finite set of indices whose cardinal is the dimension of the vectors $y_t$, constant for all the vectors $y_t$ of one and the same reference video $X_n$.

The possible locations of the objects in a frame can correspond to rectangles sliding over the frame, of different dimensions, covering all the frame.

The learning base advantageously contains the data $(x_t, y_t)_{1 \leq t \leq T}$ saved for each frame $x_t$ of each reference video X, frame by frame, for a set of T frames. The annotated frames of the learning base can comprise labels designating, by their name, the detected objects.

The detection of the objects in the frames of the reference videos can be performed using an object classifier, for example the classifier using the neural network "VGG-16" developed by Oxford University.

The annotation of the frames to constitute the learning base can be done by using low-level information to detect the objects, that is to say, in particular, by detecting their edges and/or their textures.

A first neural network can be used to learn the learning base.

Only the first layers of the neural network can be used to learn the learning base, remaining at the pixel level.

The reference videos can originate from brand videos or from e-commerce sites, notably for online advertising.

The learning base, previously constructed, can be contained on the machine or machines executing the method according to the invention. In a variant, the learning base is remote and accessible through a network, such as, for example, a wired, Internet, Wifi or Bluetooth® network.

In a variant, the learning base is provided by another annotation method, notably by a base of already existing annotated frames, for example ImageNet or even Cifar-10 or Cifar-100.

Learning the Descriptors

The preprocessing neural network is preferably trained to detect objects on the last frame of a group of h successive annotated frames $(x_t, x_{t-1}, \ldots, x_{t-h+1})$ obtained from the learning base by using the preceding frames of the group in order to learn the descriptors corresponding to the detected objects.

The network thus learns the link between the descriptors and the labels, for example the descriptor associated with the label "home", with the label "cloud" etc. This preprocessing neural network is said to be supervised because it takes as input h successive frames $(x_t, x_{t-1}, \ldots, x_{t-h+1})$ to predict object vector $y_t$.

For the learning of the descriptors from the learning base, two neural networks can thus be successively used, leading to two different successive learnings, and improving the quality of the learning method according to the invention.

Each group of frames can comprise between 2 and 32 frames, for example 4 frames.

The neural network can be expressed as the composition of two functions $\hat{y}_\theta \circ \Phi_w$, in which $\Phi_w(x_t, \ldots, x_{t-h+1})$ represents the convolutional part, corresponding to the descriptor computation function, and $\hat{y}_\theta$ the fully connected part, w and θ representing all of the parameters of the corresponding layers of the network.

Another subject of the invention, according to another of its aspects, is a method for learning descriptors for the detection and the automatic location of objects in a video, using reference videos and at least one neural network, a method in which:

a learning base is composed by detecting objects in each frame of the reference videos, and by recording each annotated frame $(x_t, y_t)_{1 \leq t \leq T}$ with the objects detected and their location, and the neural network is trained to detect objects on the last frame of a group of h successive frames $(x_t, x_{t-1}, \ldots, x_{t-h+1})$ obtained from the learning base by using the preceding frames of the group in order to learn the descriptors $\Phi_w$ $(x_t, \ldots, x_{t-h+1})$ corresponding to the detected objects.

The features described above for the method for learning class descriptors apply to the method for learning descriptors.

Learning Class Descriptors

For each class of objects $j(1 \leq j \leq J)$, one of the neural networks of the architecture is trained, to define class descriptors $z_{\theta_j}$, by using as input data the descriptors and the labels $(\phi_{k,t}, z_{k,t}^j)$ defined previously.

A model is thus learned for each class of objects, as many models as there are classes of objects being available.

The learning base makes it possible to have pairs $(x_{k,t}, y_{k,t})$ in which k is an index identifying the $k^{th}$ reference video and t designates the frame index. By virtue of the learning of the descriptors by the preprocessing neural network, these data are advantageously transformed into pairs $(\phi_{k,t}, z_{k,t}^j)$ in which $\phi_{k,t} = \Phi(x_{k,t}, x_{k,t-1}, \ldots, x_{k,t-h+1})$ and in which $z_{k,t}^j$ corresponds to the projection of the vector $y_{k,t}$ on the component i such that obj(i) corresponds to the class j.

Each computation entity m, which uses a local version of the parameters $\theta_{j,m}$ received from one of the parameter servers, can iteratively compute a projected gradient descent:

$$\theta_{j,m}^{n+1/2} = \Pi_\Theta(\theta_{j,m}^n - \gamma^n \nabla l(\theta_{j,m}^n))$$

in which $\Pi_\Theta$ designates the projection on θ, $\gamma^n$ designates a series of scalars hereinafter called the series of steps and l is the cost function that is sought to be minimized in the learning, n designating the $n^{th}$ iteration.

Once the computation entity m has performed its computation, it randomly chooses another computation entity m' and ensures an updating of the parameters according to the rule: $\theta_{j,m}^{n+1} = \theta_{j,m'}^{n+1} = (\theta_{j,m}^{n+1/2} + \theta_{j,m'}^{n+1/2})/2$.

The article by P. Bianchi and J. Jakubowicz, "*Convergence of a Multi-Agent Projected Stochastic Gradient Algorithm for Non-Convex Optimization*", IEEE Transactions on Automatic Control, 2013, proves that the method according to the invention does indeed converge toward the optimum sought in the learning phase.

Neural Network Architecture

The architecture according to the invention thus comprises neural networks learning different parameters for each class of objects. The neural networks of the architecture are thus specialized by object type.

Only a part of the neural networks of the architecture can be learned in a distributed manner over the different computation entities. Preferably, only the top part of the layers of the neural networks is learned in a distributed manner. In a variant, the bottom part of the layers of the neural networks is learned also in a distributed manner. The top layers correspond to the highest level layer, where the network is increasingly sensitive to the details of the frames.

The computation entities are preferably contained on computing machines, such as computers or computation servers. Each computing machine can comprise several graphics processors ("GPU") working in parallel and constituting as many different computation entities.

The computing machines are advantageously networked, for example through a wired, Wifi or Bluetooth® network.

The parameter servers can be contained in the random-access memory of the computing machines. In a variant, the parameter servers are remote, and accessible through a wired, Wifi or Bluetooth® network.

There can be as many parameter servers as there are computation entities. In variants, there is a ratio of one parameter server for two computation entities, or of one parameter server for four computation entities, even one parameter server for four computation entities, or one parameter server for eight computation entities, even better, one parameter server for sixteen computation entities.

Each computation entity m preferably uses only a part of the input data. The input data can thus be allocated to different storage entities so that each computation entity works only on a part of the data. The allocation of the input data between the computation entities is advantageously done randomly, the input data being able to be divided into as many portions as there are computation and/or storage entities, the input data thus following a uniform law on the number of entities.

Each computation entity can comprise at least one memory area.

The memory area of a computation entity m' is advantageously available to be interrogated by another computation entity m and respond to it, notably in the context of a read/write request on the parameter server on which the computation entity m' depends, even while the latter is in the process of performing its own computation.

Device for Learning Descriptors

Another subject of the invention, according to another of its aspects, is a device for learning class descriptors for the detection and the automatic location of objects in a video, each object belonging to a class of objects j from among a set J of classes, the device using:

a learning base, composed from reference videos and containing annotated frames $(x_t, y_t)_{1 \leq t \leq T}$ each comprising one or more labels identifying each object detected in the frames, and descriptors associated with these labels and learned previously by a preprocessing neural network from the annotated frames of the learning base, the device comprising an architecture of neural networks defined by parameters centralized on a plurality of parameter servers, and a plurality M of computation entities m working in parallel, the device being configured to train, for each class of objects j, one of the neural networks of the architecture by using as input data the descriptors and the labels $(\phi_{k,t}, z_{k,t}^j)$ to define class descriptors $\widehat{z_{\theta_j}}$, each computation entity m using, for the computation of the class descriptors $\widehat{z_{\theta_j}}$, a version of the parameters $\theta_{j,m}$ of the parameter server on which the entity depends, and returning to this parameter server the parameters updated at the end of its computation, and the parameter servers exchanging with one another the parameters of each computation entity for the training of the neural networks for each class descriptor $\widehat{z_{\theta_j}}$.

Detection and Location of the Objects

Yet another subject of the invention, according to another of its aspects, is a method for the detection and automatic location of objects in a video, each object belonging to a class of objects j from among a set J of classes, a method in which:

the class descriptors $\widehat{z_{\theta_j}}$ learned in the method for learning class descriptors as defined previously are used to learn a descriptor computation function ($\widehat{z_{\theta_j}} \circ \Phi_w$) taking as input at least the test video, and detection and location scores are obtained in the test video for each class of objects j.

The features described above for the method for learning class descriptors apply to the method for detecting and locating objects.

Computer Program Product

Yet another subject of the invention, according to another of its aspects, is a computer program product for implementing the method for learning class descriptors for the detection and the automatic location of objects in a video as described previously, each object belonging to a class of objects j from among a set J of classes, the method using:

a learning base, composed from reference videos and containing annotated frames $(x_t, y_t)_{1 \leq t \leq T}$ each comprising labels designating each object detected in the frames, descriptors associated with these labels and learned previously by a preprocessing neural network from the annotated frames of the learning base, an architecture of neural networks defined by parameters centralized on a plurality of parameter servers, and a plurality M of computation entities m working in parallel, the computer program product comprising a medium and, saved on this medium, instructions that can be read by a processor so that, when executed, each class of objects j, one of the neural networks of the architecture is trained by using as input data the descriptors and the labels $(\phi_{k,t}, z_{k,t}^j)$ to define class descriptors $\widehat{z_{\theta_j}}$, each computation entity m using, for the computation of the class descriptors $\widehat{z_{\theta_j}}$, only a part of the input data and a version of the parameters $\theta_{j,m}$ of the parameter server on which the entity depends, and returning to this parameter server the parameters updated at the end of its computation, and the parameter servers exchanging with one another the parameters of each computation entity for the training of the neural networks for each class descriptor $\widehat{z_{\theta_j}}$.

The features described above for the method for learning class descriptors apply to the computer program product.

DETAILED DESCRIPTION

Figure 3:
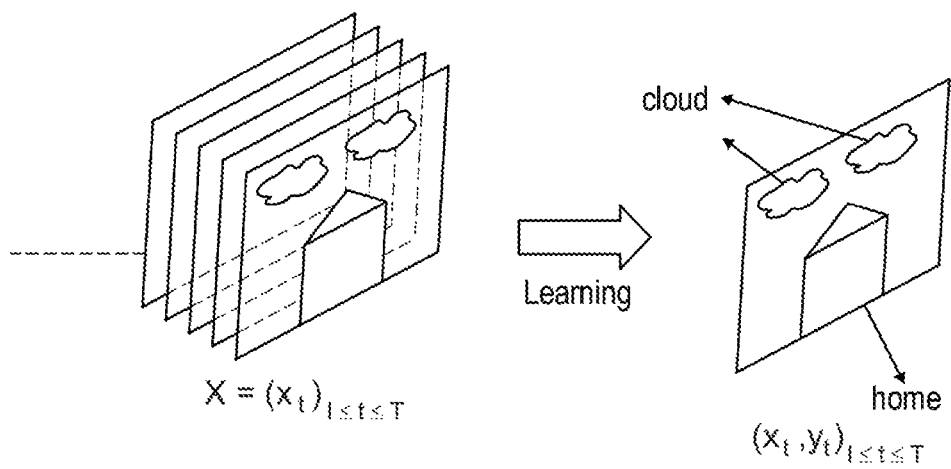
Figure 2:
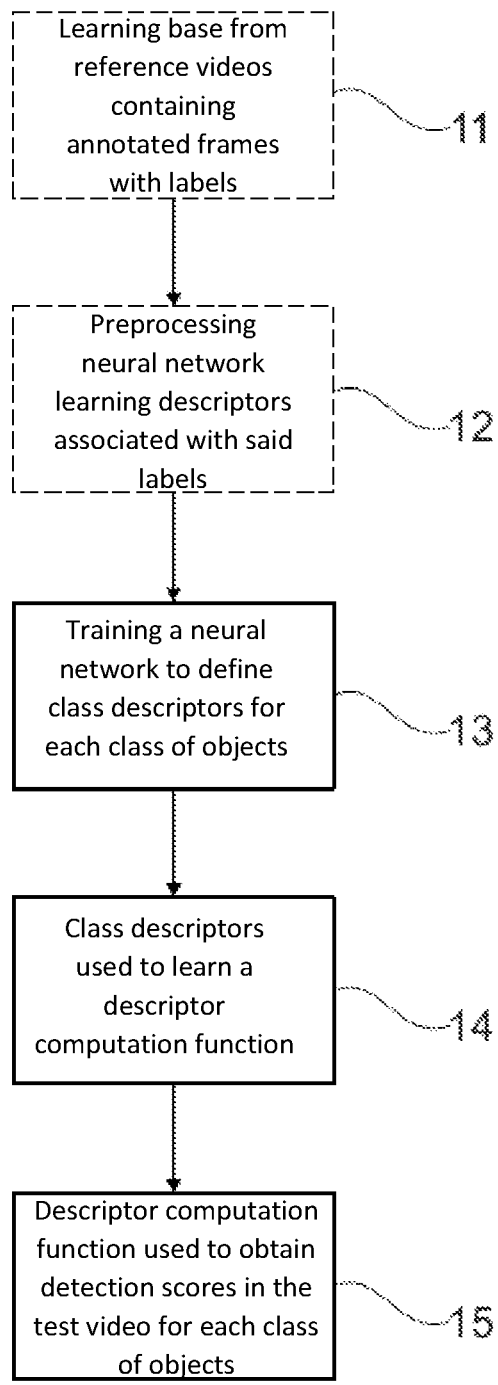
Figure 3A:
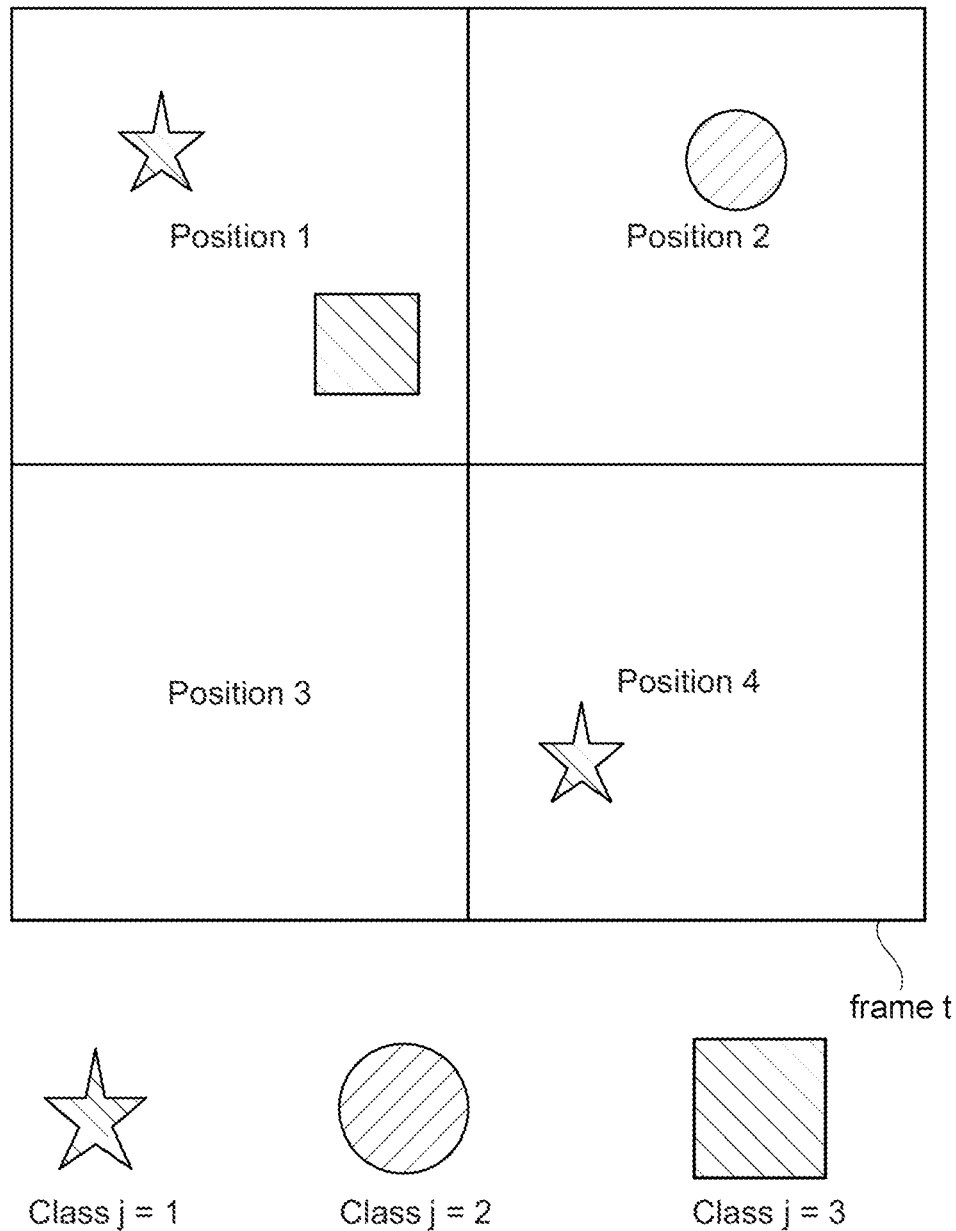
Figure 4:
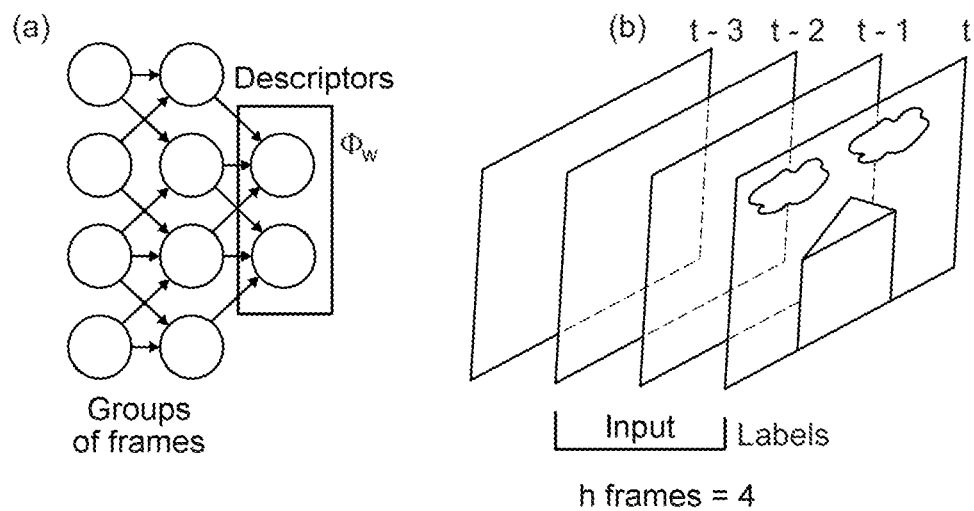
Figure 5:
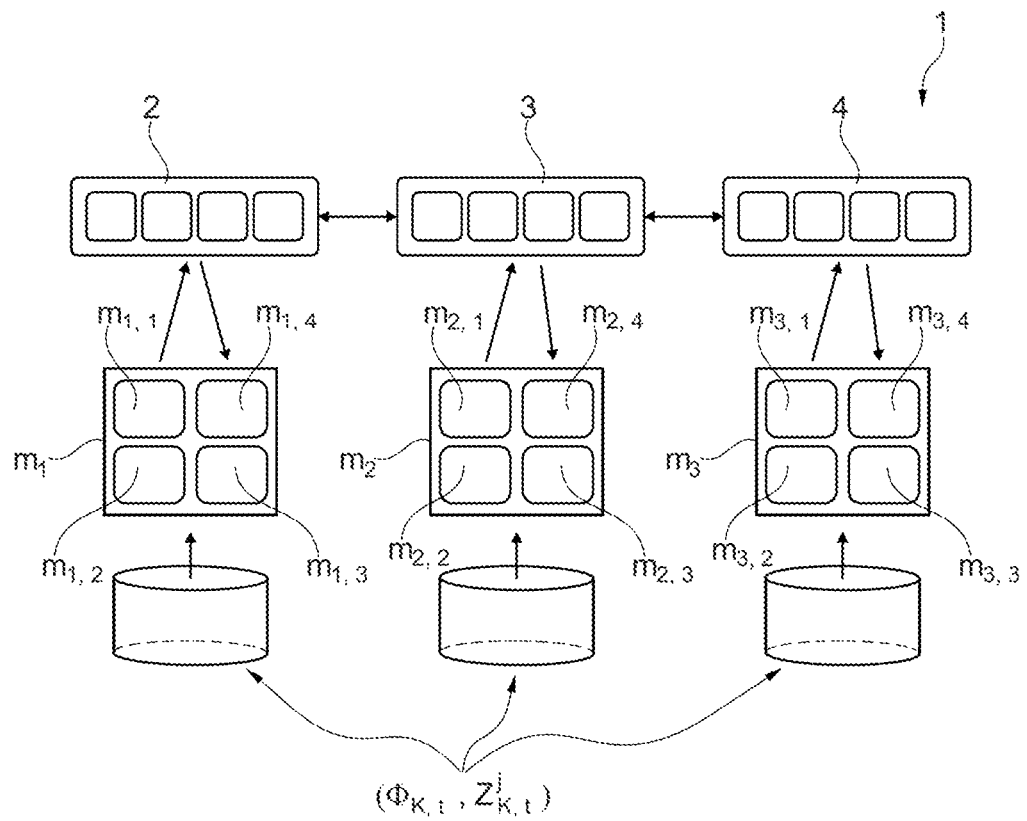

The invention will be able to be better understood on reading the following detailed description of nonlimiting examples of implementation thereof, and on studying the attached drawing in which:

FIG. 1, already described, represents an architecture of neural networks according to the prior art, FIG. 2 is a diagram representing steps of implementation of the method according to the invention, FIG. 3 illustrates the annotation of the base, frame by frame, FIG. 3A represents an example of frame containing, at different positions, objects belonging to different classes, FIG. 4 illustrates the learning of the descriptors, and FIG. 5 represents a device for learning class descriptors comprising a distributed architecture of neural networks according to the invention.

Steps of the method for detecting and locating objects in a video according to the invention are represented in FIG. 2. Each object belongs to a class of objects j from among a set J of classes. The method according to the invention advantageously uses a device 1 for learning class descriptors, represented in FIG. 5 and comprising an architecture of CNN neural networks defined by parameters centralized on a plurality of parameter servers 2, 3, 4, and a plurality M of computation entities $m_{1,p}$, $m_{2,p}$, $m_{3,p}$, with p=1 . . . 4, working in parallel. The method according to the invention can be subdivided into several steps, which will be described in detail hereinbelow.

In a step 11, a learning base is composed from reference videos and provides annotated frames $(x_t, y_t)_{1 \leq t \leq T}$. This learning base is used, in a step 12, to teach by a preprocessing neural network, of CNN type, descriptors associated with the labels contained in the annotated frames, as can be seen in FIG. 4(a). These steps 11 and 12 can be performed previously, the descriptors and the labels $((\phi_{k,t}, z_{k,t}^j)$ obtained being used as input data for training, in a step 13, one of the neural networks of the architecture 1 to define class descriptors $\widehat{z_{\theta_j}}$ for each class of objects (j).

In a step 14, the class descriptors $\widehat{z_{\theta_j}}$ are used to learn a descriptor computation function ($\widehat{z_{\theta_j}} \circ \Phi_w$) taking as input at least the test video. In a step 15, this function is used to obtain detection and location scores in the test video for each class of objects j. These detection scores are preferably scalar numbers lying between 0 and 1 giving a probability of the presence of the objects, with, for example, 1 designating its presence and 0 its absence.

As represented in FIG. 3, the learning base used to learn the descriptors is preferably trained from reference videos, and contains annotated frames $(x_t, y_t)_{1 \leq t \leq T}$ each comprising one or more labels identifying each object detected in the frames. The vector $y_t$ comprises a series of components $(y_{t,i})$ representing a scalar number lying between 0 and 1 and coding the presence of the object obj(i) at the location loc(i), with, for example, 1 designating its presence and 0 its absence.

An example of vector $y_t$, with 4 positions in the frame t and 3 classes of objects, is represented below.

The values $y_{t,i}$ correspond to a score of presence of the object of the class j at the corresponding position. The scores close to 1 of the components $y_{t,1}$, $y_{t,4}$, $y_{t,9}$, and $y_{t,6}$ correspond to the presence of the star at positions 1 and 4, of the square at position 1 and of the circle at position 2, as can be seen in FIG. 3A. In this example, the vector $z^j$ is thus equal to: $z^1 = y_{t,1} \ldots y_{t,4}$, $z^2 = y_{t,5} \ldots y_{t,8}$ and $z^3 = y_{t,9} \ldots y_{t,12}$.

$$y_t = \begin{pmatrix} y_{t,1} = 0.9 \\ y_{t,2} = 0.05 \\ y_{t,3} = 0.05 \\ y_{t,4} = 0.85 \\ y_{t,5} = 0.1 \\ y_{t,6} = 0.95 \\ y_{t,7} = 0.05 \\ y_{t,8} = 0.15 \\ y_{t,9} = 0.85 \\ y_{t,10} = 0.1 \\ y_{t,11} = 0.05 \\ y_{t,12} = 0.05 \end{pmatrix} \begin{array}{l} pos(1) = 1 \\ pos(2) = 2 \\ pos(3) = 3 \\ pos(4) = 4 \\ pos(5) = 1 \\ pos(6) = 2 \\ pos(7) = 3 \\ pos(8) = 4 \\ pos(9) = 1 \\ pos(10) = 2 \\ pos(11) = 3 \\ pos(12) = 4 \end{array} \begin{array}{l} obj(1) = 1 \\ obj(2) = 1 \\ obj(3) = 1 \\ obj(4) = 1 \\ obj(5) = 2 \\ obj(6) = 2 \\ obj(7) = 2 \\ obj(8) = 2 \\ obj(9) = 3 \\ obj(10) = 3 \\ obj(11) = 3 \\ obj(12) = 3 \end{array}$$

A first neural network is advantageously used to learn the learning base.

As described previously, the preprocessing neural network is trained to detect objects on the last frame $x_t$ of a group of h successive frames $(x_t, x_{t-1}, \ldots, x_{t-h+1})$, visible in FIG. 4(b), 4 of them in the example considered and obtained from the previously composed learning base. The preprocessing neural network uses, for this, the preceding frames $(x_{t-1}, x_{t-2}, x_{t-3})$ of the group in order to learn the descriptors $\Phi_w(x_t, \ldots, x_{t-h+1})$ corresponding to the objects detected, as represented in FIG. 4(b).

A device 1 for learning class descriptors according to the invention comprising a distributed architecture of neural networks is represented in FIG. 5. In the example considered, the device 1 comprises three computing machines $m_1$, $m_2$, $m_3$, each of these computing machines comprising four graphics processors "GPU" $m_{1,p}$, $m_{2,p}$, $m_{3,p}$, with p=1 . . . 4, each constituting a computation entity within the meaning of the invention.

As described previously, the computation of the class descriptors $\widehat{z_{\theta_j}}$, each computation entity m uses a version of the parameters $\theta_{j,m}$ of the parameter server on which the entity depends, and returns to this parameter server the parameters updated at the end of its computation. The parameter servers 2, 3, 4 exchange with one another the parameters of each computation entity for the training of the neural networks for each class descriptor $\widehat{z_{\theta_j}}$.

Preferably and as represented, each computing machine $m_1$, $m_2$, $m_3$ uses only a part of the input data $(\phi_{k,t}, z_{k,t}^j)$ The invention is not limited to the example which has just been described.

A greater number of frames per group can be used, which allows for a faster training. The choice of the number of frames per group of frames can depend on the type of video: for example, if there are frequent changes of scene, a smaller number of frames per group is chosen, or if the general movement of the video is slow, a greater number of frames per group is chosen.

In the example of FIG. 5, the device according to the invention comprises 3 parameter servers and 3 computing machines, but the invention is not limited to a particular number of computation entities and of parameter servers.

The invention claimed is:

1. A method for learning class descriptors for detecting and automatically locating objects in a video, each object belonging to a class of objects from among a set of classes, the method using:
   a learning base, composed from reference videos and containing annotated frames each comprising one or more labels identifying each object detected in said annotated frames,
   descriptors associated with said labels and learned previously by a preprocessing neural network from the annotated frames of the learning base,
   an architecture of neural networks defined by parameters centralized on a plurality of parameter servers, and
   a plurality of computation entities working in parallel,
   the method comprising at least the step of training, for each class of objects, one of the neural networks of the architecture by using as input data the descriptors and the labels to define class descriptors,
   each computation entity of said plurality of computation entities using, for the computation of the class descriptors, a version of the parameters of a parameter server of said plurality of parameter servers on which the entity depends, and returning to said parameter server the parameters updated at the end of its computation,
   the step of having the parameter servers exchanging with one another the parameters of each computation entity for the training of the neural networks for each class descriptor, and
   the learning base contains data saved for each frame of each reference video, frame by frame, for a set of frames these data containing a vector comprising a series of components representing a scalar number lying between 0 and 1 and coding the presence of the object at the location, with, in particular, 1 designating its presence and 0 its absence.

2. The method as claimed in claim 1, in which the learning base is composed from the detection and the location of the objects frame by frame, in each reference video.

3. The method as claimed in claim 1, wherein a first neural network is used to learn the learning base.

4. The method as claimed in claim 1, wherein the preprocessing neural network is trained to detect objects on the last frame of a group of successive frames obtained from the learning base by using the preceding frames of the group in order to learn the descriptors corresponding to the detected objects.

5. The method as claimed in claim 4, wherein each group of frames comprises between 2 and 32 frames.

6. The method as claimed in claim 1, wherein each computation entity uses only a part of the input data.

7. The method as claimed in claim 1, wherein each computation entity, which uses a local version of the parameters received from one of the parameter servers, iteratively computes a projected gradient descent:

$$\theta_{j,m}^{n+1/2} = \Pi_\Theta(\theta_{j,m}^n - \gamma^n \nabla l(\theta_{j,m}^n))$$

in which $\Pi_\Theta$ designates the projection on $\Theta$, $\gamma^n$ designates a series of scalars hereinafter called steps and l is the cost function that is sought to be minimized in the learning.

8. The method as claimed in claim 1, wherein, once the computation entity has performed its computation, it randomly chooses another computation entity and ensures an updating of the parameters according to the rule: $\theta_{j,m}^{n+1}=\theta_{j,m'}^{n+1}=(\theta_{j,m}^{n+1/2}+\theta_{j,m'}^{n+1/2})/2$.

9. The method as claimed in claim 1, wherein, each computation entity comprising at least one memory area, the memory area of a computation entity is available to be interrogated by another computation entity and responds to it, notably in the context of a read/write request on the parameter server on which the computation entity depends, even while the latter is in the process of performing its own computation.

10. The method as claimed in claim 1, wherein only a part of the neural networks of the architecture is learned in a distributed manner over the different computation entities.

11. The method as claimed in claim 10, wherein only a top part of the layers of the neural networks is learned in a distributed manner.

12. The method as claimed in claim 1, wherein the neural networks used are convolutional neural networks (CNN).

13. A method for learning class descriptors for detecting and automatic locating objects in a video, each object belonging to a class of objects from among a set of classes, the method using:
 a learning base, composed from reference videos and containing annotated frames each comprising one or more labels identifying each object detected in said annotated frames,
 descriptors associated with said labels and learned previously by a preprocessing neural network from the annotated frames of the learning base,
 an architecture of neural networks defined by parameters centralized on a plurality of parameter servers, and
 a plurality of computation entities working in parallel,
 method comprising at least the step of training, for each class of objects, one of the neural networks of the architecture by using as input data the descriptors and the labels to define class descriptors,
 each computation entity of said plurality of computation entities using, for the computation of the class descriptors, a version of the parameters of a parameter server of said plurality of parameter servers on which the entity depends, and returning to said parameter server the parameters updated at the end of its computation,
 the step of having the parameter servers exchanging with one another the parameters of each computation entity, for the training of the neural networks for each class descriptor, and each computation entity, which uses a local version of the parameters received from one of the parameter servers, iteratively computes a projected gradient descent:

$$\theta_{j,m}^{n+1/2}=\Pi_{\Theta}(\theta_{j,m}^{n}-\gamma^{n}\nabla l(\theta_{j,m}^{n}))$$

in which $\Pi_{\Theta}$ designates the projection on $\Theta$, $\gamma^{n}$ designates a series of scalars hereinafter called steps and $l$ is the cost function that is sought to be minimized in the learning.

14. A method for learning class descriptors for detecting and automatic locating objects in a video, each object belonging to a class of objects from among a set of classes, the method using:
 a learning base, composed from reference videos and containing annotated frames each comprising one or more labels identifying each object detected in said annotated frames,
 descriptors associated with said labels and learned previously by a preprocessing neural network from the annotated frames of the learning base,
 an architecture of neural networks defined by parameters centralized on a plurality of parameter servers, and
 a plurality of computation entities working in parallel,
 method comprising at least the step of training, for each class of objects, one of the neural networks of the architecture by using as input data the descriptors and the labels to define class descriptors,
 each computation entity of said plurality of computation entities using, for the computation of the class descriptors, a version of the parameters of a parameter server of said plurality of parameter servers on which the entity depends, and returning to said parameter server the parameters updated at the end of its computation,
 the step of having the parameter servers exchanging with one another the parameters of each computation entity for the training of the neural networks for each class descriptor, and once the computation entity has performed its computation, it randomly chooses another computation entity and ensures an updating of the parameters according to the rule: $\theta_{j,m}^{n+1}=\theta_{j,m'}^{n+1}=(\theta_{j,m}^{n+1/2}+\theta_{j,m'}^{n+1/2})/2$.

* * * * *